United States Patent [19]
Nishio et al.

[11] 3,891,568
[45] June 24, 1975

[54] METHOD AND COMPOSITION FOR CONTROL OF CORROSION AND SCALE FORMATION IN WATER SYSTEMS

[75] Inventors: Kazuo Nishio, Chicago; Paul G. Bird, Wheaton, both of Ill.

[73] Assignee: Wright Chemical Corporation, Chicago, Ill.

[22] Filed: Aug. 25, 1972

[21] Appl. No.: 283,937

[52] U.S. Cl. ............... 252/181; 21/2.7 A; 252/180; 252/389 A; 252/390
[51] Int. Cl.$^2$ ..................... C02B 5/00; C23F 11/08
[58] Field of Search ... 252/180, 181, 57, 58, 389 A, 252/390; 260/429.9, 606.5 P; 21/2.7 A

[56] References Cited
UNITED STATES PATENTS

| | | | |
|---|---|---|---|
| 3,214,454 | 10/1965 | Blaser et al. | 260/429.9 |
| 3,336,221 | 8/1967 | Ralston | 252/180 |
| 3,483,033 | 12/1969 | Casey | 252/181 |
| 3,649,547 | 3/1972 | Lummus et al. | 252/181 |
| 3,699,052 | 10/1972 | Petrey, Jr. et al. | 252/181 |
| 3,723,347 | 3/1973 | Mitchell | 252/181 |

OTHER PUBLICATIONS
A. Weisstuch & C. E. Schell, Corrosion, August, 1972, page 299, An Official Publication of Nace, The Corrosion Society.

*Primary Examiner*—Mayer Weinblatt
*Assistant Examiner*—John D. Smith
*Attorney, Agent, or Firm*—Lockwood, Dewey, Zickert & Alex

[57] ABSTRACT

A composition for controlling corrosion and scale deposition in aqueous systems which comprises a phosphonate, an alkali metal molybdate salt and an alkali metal mercaptobenzothiazole or benzotriazole. In a preferred embodiment, a polyacrylate or polyacrylamide is combined with these constituents. In accordance with the method of this invention, these constituents are added to the aqueous system in amounts which are sufficient to provide a phosphonate concentration of at least 0.8 ppm, a molybdate salt concentration of at least 7 ppm and a mercaptobenzothiazole salt concentration of at least 2 ppm or benzotriazole concentration of at least 1 ppm.

14 Claims, No Drawings

METHOD AND COMPOSITION FOR CONTROL OF CORROSION AND SCALE FORMATION IN WATER SYSTEMS

The present invention generally relates to the control of corrosion and scale deposition in aqueous systems and, more particularly, to the prevention of corrosion and scale in recirculating cooling water systems.

The present invention is particularly directed to the conjoint use of a phosphonate, a molybdate salt and a mercaptobenzothiazole salt or benzotriazole for the control of corrosion and scale deposition in recirculating cooling water systems. In this regard, it has been found that these three constituents uniquely cooperate to provide particularly effective control of corrosion and scale deposition in a wide variety of cooling water systems and are particularly suitable for use in cooling water systems which include copper and copper-based alloys. As such, the present invention is distinguishable from prior art corrosion inhibitors used for similar purposes in that the composition and method of this invention are characterized by the absence of chromium and zinc compounds as well as by the extremely low level of phosphonates which are employed.

It is an object of the present invention to provide an improved method and composition for the control of corrosion and scale deposition in aqueous systems, particularly recirculating cooling water systems.

Another object of the present invention is to provide an improved method and composition for controlling corrosion and scale deposition in cooling water systems which include components composed of copper and copper-based alloys.

Another object of the present invention is to provide an improved method and composition for controlling corrosion and scale deposition in cooling water systems which method and composition involve the conjoint use of phosphonate, a molybdate salt, and a mercaptobenzothiazole salt or benzotriazole.

Another object of the present invention is to provide an improved method and composition for the control of corrosion and scale deposition in cooling water systems which involve the use of a polyacrylate in conjunction with a phosphonate, molybdate salt, and a mercaptobenzothiazole salt or benzotriazole.

These and other objects of the present invention will be apparent from a reading of the following detailed description thereof.

In accordance with the present invention, it has been discovered that compositions which include a phosphonate, a molybdate salt and a mercaptobenzothiazole salt or benzotriazole provide effective control of corrosion and scale in aqueous systems, particularly recirculating cooling water systems. In this regard, it is important to note that the use of all three of these constituents is essential to the present invention and that, in combination, these constituents cooperate to provide corrosion control and scale inhibition to an extent which is far superior to that obtainable with any two of these materials in combination.

The phosphonates included in compositions of the present invention are selected from the class of compounds having the general formula

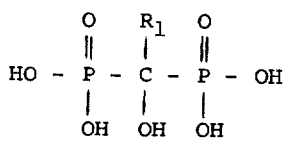

wherein $R_1$ is alkyl having from 1 to 5 carbon atoms, alkali metal and ammonium salts of said compounds, and

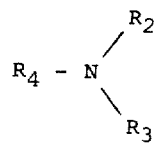

wherein $R_2$ is

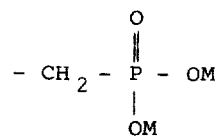

$R_3$ is selected from the class consisting of $R_2$ and —$CH_2CH_2OH$, and $R_4$ is selected from the group consisting of $R_2$, —$CH_2CH_2OH$, and

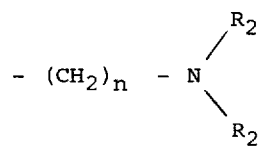

wherein each M is independently selected from the group consisting of H, $NH_4$ and alkali metal, and $n$ is an integer from 1 to 3 inclusive. A detailed description of these and other suitable phosphonates is set forth in U.S. Pat. Nos. 3,214,454 and 3,336,221, the disclosures of which are incorporated herein by reference.

Specific phosphonates which are particularly preferred include 1-hydroxyethylidene-1, 1-diphosphonic acid, and the alkali metal and ammonium salts thereof; nitrilo-tri(methylene phosphonic acid), and the alkali metal and ammonium salts thereof; and, ethylenediamine tetra(methylphosphoric acid) and the alkali metal and ammonium salts thereof.

The molybdate salts included in the compositions of the present invention are selected from the group consisting of the alkali metal and ammonium molybdate salts. In this regard, sodium molybdate is preferred.

The mercaptobenzothiazole salts which are included in the compositions of the present invention are the alkali metal and ammonium salt forms of mercaptobenzothiazole. As was the case with the molybdate salts, the sodium salt form is preferred.

It should be noted with regard to the above constituents that in installations which include components composed of copper and copper-based alloys, the ammonium salt forms of these constituents should be avoided.

If desired, the compositions of the present invention may also include a polyacrylate which, in conjunction with the phosphonate, operates to provide improved scale control. In this regard, those polyacrylates which can be advantageously used are the alkali metal and ammonium salts of polyacrylate and of the partially hydrolyzed polyacrylamides. In general, the lower molecular weight forms of these materials are preferred, that is, those forms having a molecular weight of from approximately 5,000 to 20,000 and, in particular, those having molecular weights of from approximately 8,000 to 10,000. A particularly suitable polyacrylate which may be used to provide improved scale control is the material marketed under the trademark "CYA-NAMER P-35" (American Cyanamid). This material is generally described as an incompletely hydrolyzed sodium polyacrylate salt.

Compositions embodying the present invention may also include further constituents which will impart to the formulation additional desired properties. For example, clarifying agents such as sodium ethylenediamine tetra acetate (EDTA) and M-Pyrol can be used to impart clearness to the formulation and eliminate the presence of sediment. In this regard, it has also been found that EDTA imparted beneficial corrosion protection properties to the formulation. Also, viscosity thickeners such as, for example, carboxymethyl cellulose, can be used to impart body to these compositions and thus retard settling. Sodium hydroxide or an equivalent base may also be advantageously incorporated in the formulation to make it mildly alkaline. In this regard, the use of the sodium hydroxide is preferred in those embodiments of the present invention wherein a mercaptobenzothiazole salt is used since the sodium hydroxide operates to hold the mercaptobenzothiazole in solution. Accordingly, it should be appreciated that while these materials impart desirable properties to the over-all composition of the present invention, their inclusion is not essential to achieve effective control of corrosion and scale inhibition in cooling water systems.

In accordance with the method of the present invention, the essential constituents of the present invention are added to a cooling water system in relative amounts which are sufficient to provide that system with a phosphonate concentration of at least 0.8 ppm, a molybdate salt concentration of at least 7 ppm, and a mercaptobenzothiazole salt concentration of at least 2 ppm or benzotriazole concentration of at least 1 ppm. In embodiments wherein a polyacrylate is also used, it is recommended that the amount of this constituent which is added to the cooling water system be such as to provide a polyacrylate concentration of at least 2 ppm. The use of increased amounts of the essential ingredients of the present invention will not exhibit any adverse effects on water cooling systems, however, it is generally preferred that the concentration of the phosphonate in the cooling water system range from approximately 0.8 to 3 ppm, that the concentration of the molybdate salt range from approximately 7 to 14 ppm, and that the concentration of the merceptobenzothiazole salt constituent range from approximately 2 to 15 ppm or benzotrizole constituent range from approximately 1 to 15 ppm.

A particularly preferred formulation embodying the present invention is generally composed of the following constituents in the amounts shown below:

| Constituent | Parts by Weight |
|---|---|
| Water | 68.25 |
| EDTA | .25 |
| NaOH | 3.0 |
| HEDP* | 2.0 |
| Polyacrylate** | 5.0 |
| Sodium Molybdate | 10.0 |
| Carboxymethylcellulose | 0.5 |
| Sodium Mercaptobenzothiazole | 10.0 |
| M-Pyrole | 1.0 |
| | 100.0 |

*1-hydroxyethylidene-1, 1-diphosphonic acid
**Cyanamer P-35

The formulation shown above would, in a typical commercial or industrial cooling water system, be used in concentrations ranging from as little as 70 ppm to 200 ppm to achieve effective control of corrosion and scale retardation. In this regard, it has been found that it is often good practice, however, to "shock" a cooling water system with as much as 400 ppm of this formulation when it is first introduced into the system.

While in the foregoing specification, for purposes of illustrating specific embodiments of this invention, we have set forth many details, it will be apparent to those skilled in the art that modifications and variations may be made without departing from the spirit and scope of this invention. Accordingly, this invention is to be limited only in scope by the appended claims.

We claim:

1. A method for controlling corrosion and scale deposition in an aqueous system, comprising adding to said system:

A first constituent selected from the class consisting of (a) compounds having the general formula

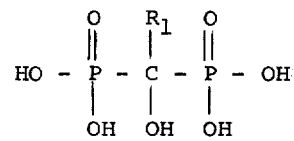

wherein $R_1$ is alkyl having from 1 to 5 carbon atoms, and alkali metal and ammonium salts of said compounds, and (b) compounds having the general formula

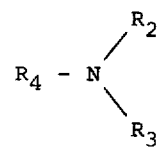

wherein $R_2$ is

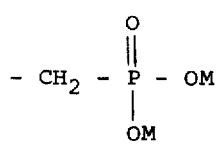

$R_3$ is selected from the class consisting of $R_2$ and $-CH_2CH_2OH$, and $R_4$ is selected from the group consisting of $R_2$, $-CH_2CH_2OH$, and

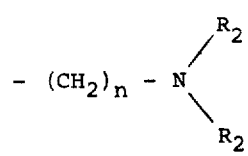

wherein each M is independently selected from the group consisting of H, $NH_4$ and alkali metal, and $n$ is an integer from 1 to 3 inclusive;

a second constituent selected from the group consisting of alkali metal molybdate and ammonium molybdate salts; and a third constituent selected from the group consisting of benzotriazole and the alkali metal and ammonium salts of mercaptobenzothiazole, said first, second and third constituents being added in relative amounts sufficient to provide said aqueous system with a concentration of said first constituent of at least 0.8 ppm, a concentration of said second constituent of at least 7 ppm, and a concentration of said third constituent of at least 1 ppm if said third constituent is benzotriazole and of at least 2 ppm if said third constituent is a mercaptobenzothiazole salt.

2. The method of claim 1 wherein said first constituent is selected from the group consisting of 1-hydroxyethylidene-1, 1-diphosphonic acid, and the alkali metal and ammonium salts thereof.

3. The method of claim 1 wherein said first constituent is selected from the group consisting of nitrilo-tri(methylene phosphonic acid), and the alkali metal and ammonium salts thereof.

4. The method of claim 1 wherein an alkali metal or ammonium salt of a polyacrylate or a partially hydrolyzed polyacrylamide is also added to said system.

5. The method of claim 1 wherein said constituents are added to said aqueous system in amounts sufficient to provide in said system from approximately 0.8 to 3 ppm of said first constituent, from approximately 7 to 14 ppm of said second constituent, and from approximately 1 to 15 ppm of said third constituent if said third constituent is benzotriazole and from approximately 2 to 15 ppm of said third constituent if said third constituent is a mercaptobenzothiazole salt.

6. The method of claim 1 wherein said second constituent is sodium molybdate.

7. The method of claim 1 wherein said third constituent is sodium mercaptobenzothiazole.

8. The method of claim 1 wherein said first constituent is selected from the class consisting of 1-hydroxyethylidene-1, 1-diphosphonic acid, nitrilo-tri(methylenephosphonic acid) and sodium salts thereof, said second constituent is sodium molybdate, and said third constituent is selected from the group consisting of benzotriazole and the sodium salts of mercaptobenzothiazole.

9. A formulation for controlling corrosion and scale deposition in aqueous systems, said formulation consisting essentially of:

a first constituent selected from the class consisting of (a) compounds having the general formula

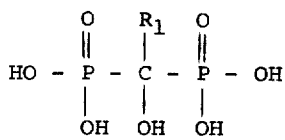

wherein $R_1$ is alkyl having from 1 to 5 carbon atoms, and alkali metal and ammonium salts of said compounds, and (b) compounds having the general formula

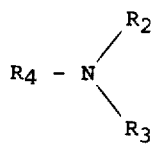

wherein $R_2$ is

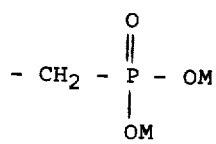

$R_3$ is selected from the class consisting of $R_2$ and —$CH_2CH_2OH$, and $R_4$ is selected from the group consisting of $R_2$, —$CH_2CH_2OH$, and

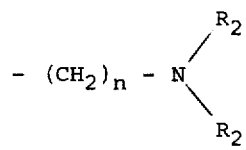

wherein each M is independently selected from the group consisting of H, $NH_4$ and alkali metal, and $n$ is an integer from 1 to 3 inclusive;

a second constituent selected from the group consisting of alkali metal molybdate and ammonium molybdate salts; and a third constituent selected from the group consisting of benzotriazole and the alkali metal and ammonium salts of mercaptobenzothiazole, said first, second and third constituents being present in relative amounts in said formulation such that when said formulation is added to an aqueous system in an amount sufficient to provide a concentration in said aqueous system of said first constituent of at least 0.8 ppm, the concentration of said second constituent in said aqueous system will be at least 7 ppm, and the concentration of said third constituent in said aqueous system will be at least 1 ppm if said third constituent is benzotriazole and of at least 2 ppm if said third constituent is a mercaptobenzothiazole salt.

10. The formulation of claim 9 wherein said first constituent is selected from the group consisting of the alkali metal and ammonium salts of 1-hydroxyethylidene-1, 1-diphosphonic acid.

11. The formulation of claim 9 wherein said first constituent is selected from the group consisting of the alkali metal and ammonium salts of nitrilo-tri(methylene phosphonic acid).

12. The formulation of claim 9 wherein said second constituent is sodium molybdate.

13. The formulation of claim 9 wherein said third constituent is sodium mercaptobenzothiazole.

14. A formulation for controlling corrosion and scale deposition in aqueous systems, said formulation consisting essentially of:

a first constituent selected from the class consisting of (a) compounds having the general formula

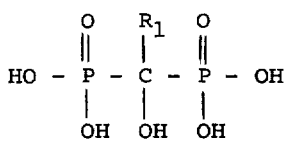

wherein $R_1$ is alkyl having from 1 to 5 carbon atoms, and alkali metal and ammonium salts of said compounds, and (b) compounds having the general formula

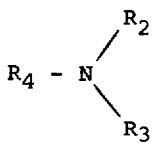

wherein $R_2$ is

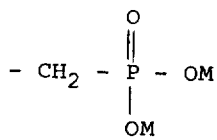

$R_3$ is selected from the class consisting of $R_2$ and $-CH_2CH_2OH$, and $R_4$ is selected from the group consisting of $R_2$, $-CH_2CH_2OH$, and

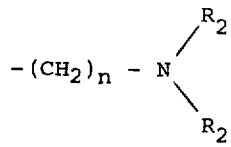

wherein each M is independently selected from the group consisting of H, $NH_4$ and alkali metal, and $n$ is an integer from 1 to 3 inclusive;

a second constituent selected from the group consisting of alkali metal molybdate and ammonium molybdate salts;

a third constituent selected from the group consisting of benzotriazole and the alkali metal and ammonium salts of mercaptobenzothiazole, said first, second and third constituents being present in relative amounts in said formulation such that when said formulation is added to an aqueous system in an amount sufficient to provide a concentration in said aqueous system of said first constituent of at least 0.8 ppm, the concentration of said second constituent in said aqueous system will be at least 7 ppm, and the concentration of said third constituent in said aqueous system will be at least 1 ppm if said third constituent is benzotriazole and of at least 2 if said third constituent is a mercaptobenzothiazole salt; and a fourth constituent selected from the group consisting of alkali metal polyacrylate, ammonium polyacrylate, and partially hydrolyzed polyacrylamide.

* * * * *